(12) United States Patent
Chen

(10) Patent No.: US 7,431,403 B1
(45) Date of Patent: Oct. 7, 2008

(54) WHEEL RIM FOR BICYCLE

(75) Inventor: Chao-Ying Chen, Tainan Hsien (TW)

(73) Assignee: Alex Global Technology, Inc., Tainan Hsien (TW)

( * ) Notice: Subject to any disclaimer, the term of this patent is extended or adjusted under 35 U.S.C. 154(b) by 56 days.

(21) Appl. No.: 11/732,180

(22) Filed: Apr. 3, 2007

(51) Int. Cl.
*B60B 21/02* (2006.01)

(52) U.S. Cl. .......................... 301/95.101; 301/95.106; 301/95.107

(58) Field of Classification Search .............. 301/55, 301/58, 67, 73, 79, 95.101, 95.104, 95.105, 301/95.106, 95, 107, 95.108; 29/894.35
See application file for complete search history.

(56) References Cited

U.S. PATENT DOCUMENTS

| | | | | |
|---|---|---|---|---|
| 365,091 | A * | 6/1887 | Owen | 280/200 |
| 5,653,510 | A * | 8/1997 | Osborne | 301/30 |
| 6,145,937 | A * | 11/2000 | Chen | 301/58 |
| 6,402,255 | B1 * | 6/2002 | Chen | 301/95.101 |
| 6,502,906 | B1 * | 1/2003 | Chen | 301/58 |
| 6,817,680 | B2 | 11/2004 | Chen | |

* cited by examiner

*Primary Examiner*—Russell D Stormer
(74) *Attorney, Agent, or Firm*—Frommer Lawrence & Haug LLP; Ronald R. Santucci

(57) ABSTRACT

A wheel rim includes an annular rim body having a horizontally disposed rim axis and an imaginary central plane that is perpendicular to the rim axis. The rim body includes a pair of annular side walls, an annular base wall, a pair of annular strengthening walls, and an annular reinforcing wall. The annular side walls are disposed respectively on opposite sides of the imaginary central plane. The annular base wall interconnects the annular side walls. Each of the annular strengthening walls extends from a respective one of the annular side walls toward the imaginary central plane and is disposed radially outward relative to the annular base wall. The reinforcing wall includes a pair of connecting segments, each of which interconnects the annular base wall and a respective one of the annular strengthening walls, and a reinforcing protruding segment that protrudes radially and outwardly relative to the rim axis.

14 Claims, 6 Drawing Sheets

WHEEL RIM FOR BICYCLE

BACKGROUND OF THE INVENTION

1. Field of the Invention

The invention relates to a wheel rim, more particularly to a bicycle wheel rim.

2. Description of the Related Art

As shown in FIG. 1, a conventional bicycle wheel rim 1 for retaining a tire 11 and a plurality of spoke fastening components 10 comprises a pair of opposite annular side walls 12 that are spaced apart from each other, and that surround a horizontally disposed rim axis (not shown), respectively. Each of the annular side walls 12 has a radial inner edge 121, and a radial outer edge 122 for retaining the tire 11. The conventional wheel rim 1 further comprises an annular base wall 13 interconnecting the radial inner edges 121 of the annular side walls 12, an annular reinforcing wall 14 interconnecting the annular side walls 12 and surrounding the annular base wall 13, and a pair of opposite annular connecting walls 15 interconnecting the annular base wall 13 and the annular reinforcing wall 14. The spoke fastening components 10 extend through the annular base wall 13 and are disposed between the annular connecting walls 15.

By virtue of the annular connecting walls 15, the strength of the conventional wheel rim 1 is strengthened. However, since the annular base wall 13 and the annular reinforcing wall 14 are formed as arches that open away from the rim axis, the conventional wheel rim 1 is likely to deform under the application of a lateral thrust force. The drawback is very serious when the conventional wheel rim 1 is applied to extreme sport vehicles that require a wheel rim with a relatively wide and flat radial cross-section, such as jumping bikes and mountain bicycles.

U.S. Pat. No. 6,817,680 B2 discloses another conventional bicycle wheel rim. As shown in FIG. 2, the conventional wheel rim 2 for retaining a tire 21 and a plurality of spoke fastening components 20 comprises a pair of opposite annular side walls 22 that are spaced apart from each other, and that surround a horizontally disposed rim axis (not shown), respectively. The conventional wheel rim 2 further comprises an annular base wall 23 interconnecting radial inner edges 221 of the annular side walls 22, a pair of annular reinforcing walls 24, and an annular angled wall 25. Each of the annular reinforcing walls 24 has one edge connected to the annular base wall 23, and another edge connected to a respective one of the annular side walls 22. The annular angled wall 25 includes a bend portion 251 and a pair of oblique portions 252 extending obliquely from opposite edges of the bending portion 251 to the annular base wall 23. The spoke fastening components 20 extend through the annular base wall 23, and are disposed between a respective one of the annular reinforcing walls 24 and a corresponding one of the oblique portions 252 of the annular angled wall 25.

By virtue of the annular angled wall 25, the strength of the annular base wall 23 is strengthened. However, since stress forces that are applied to the annular angled wall 25 will concentrate at the bend portion 251, and since the annular angled wall 25 is connected to the annular base wall 23, the conventional wheel rim 2 is also likely to deform under the application of a lateral thrust force. Like the previous conventional wheel rim 1, the drawback is very serious when the conventional wheel rim 2 is required to have a relatively wide and flat radial cross-section.

SUMMARY OF THE INVENTION

Therefore, the object of the present invention is to provide a wheel rim that has a strong and light construction.

Accordingly, a wheel rim of the present invention comprises an annular rim body having a horizontally disposed rim axis and an imaginary central plane that is perpendicular to the rim axis. The rim body includes a pair of annular side walls, an annular base wall, a pair of annular strengthening walls, and an annular reinforcing wall. The annular side walls are disposed respectively on opposite sides of the imaginary central plane and surround the rim axis. The annular base wall interconnects the annular side walls. Each of the annular strengthening walls extends from a respective one of the annular side walls toward the imaginary central plane and is disposed radially outward relative to the annular base wall. The reinforcing wall includes a pair of connecting segments, each of which interconnects the annular base wall and a respective one of the annular strengthening walls, and a reinforcing protruding segment that interconnects the connecting segments and that protrudes radially and outwardly relative to the rim axis.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
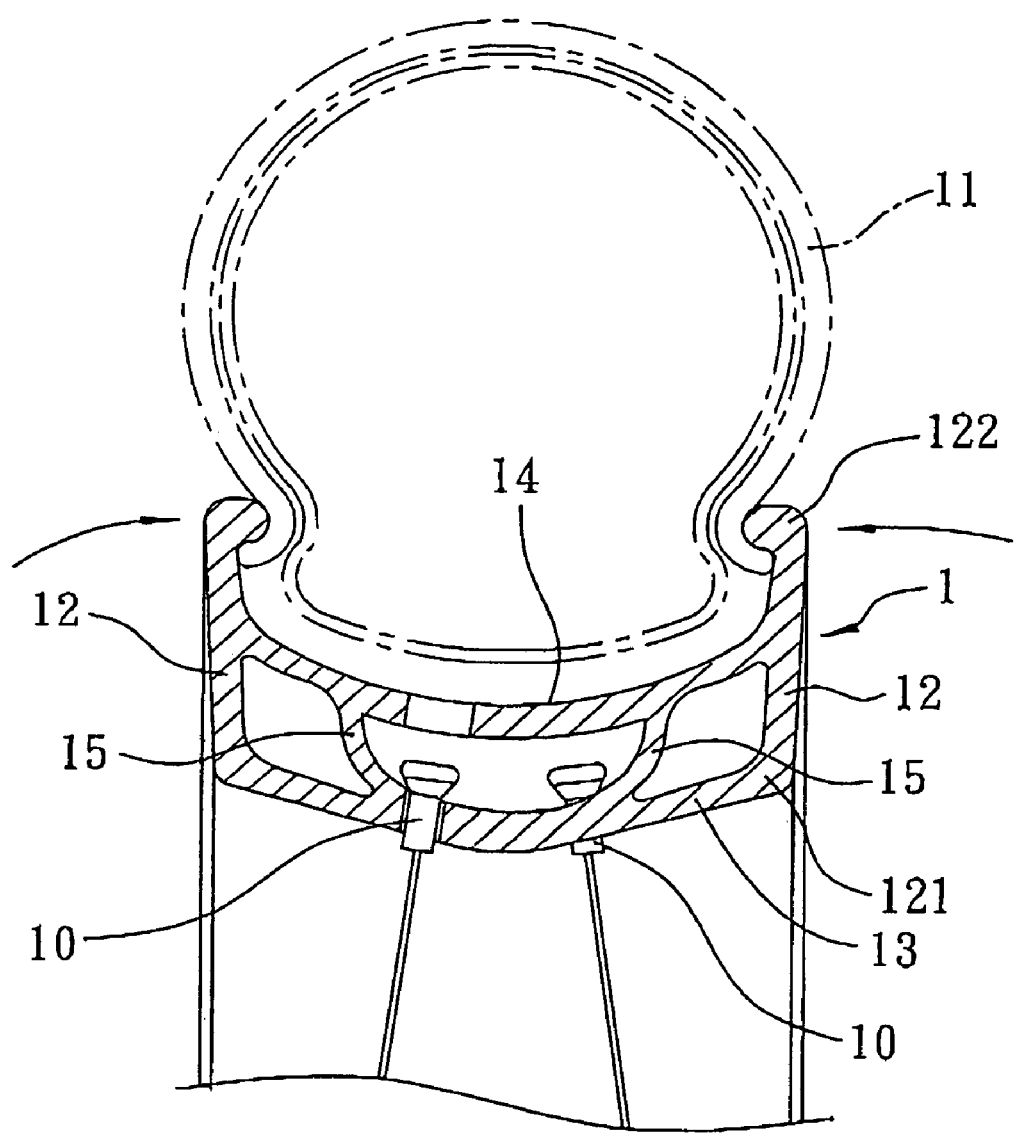
FIG. 1 is a fragmentary sectional view of a conventional wheel rim.
Figure 2:
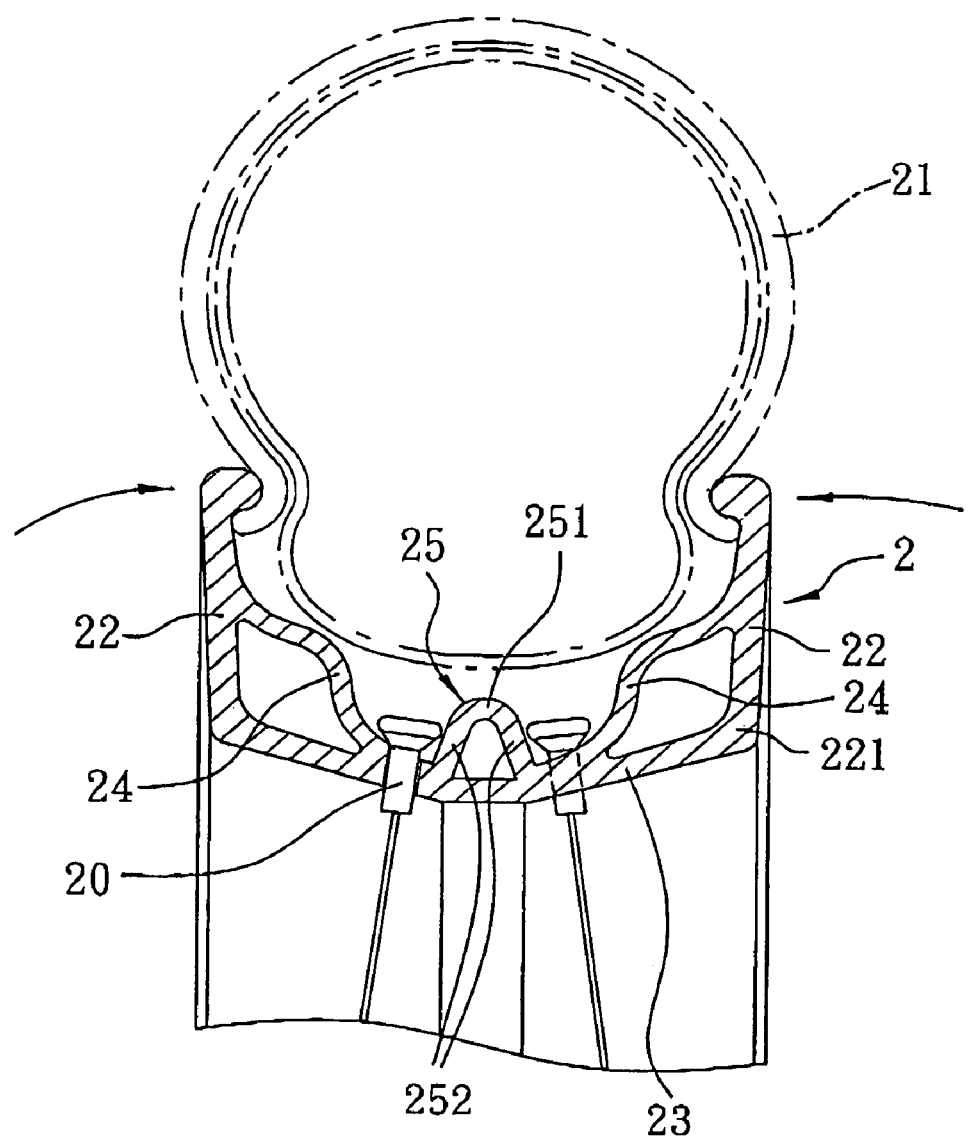
FIG. 2 is a fragmentary sectional view of another conventional wheel rim disclosed in U.S. Pat. No. 6,817,680 B2.

Before the present invention is described in greater detail, it should be noted that like elements are denoted by the same reference numerals throughout the disclosure.

Figure 3:
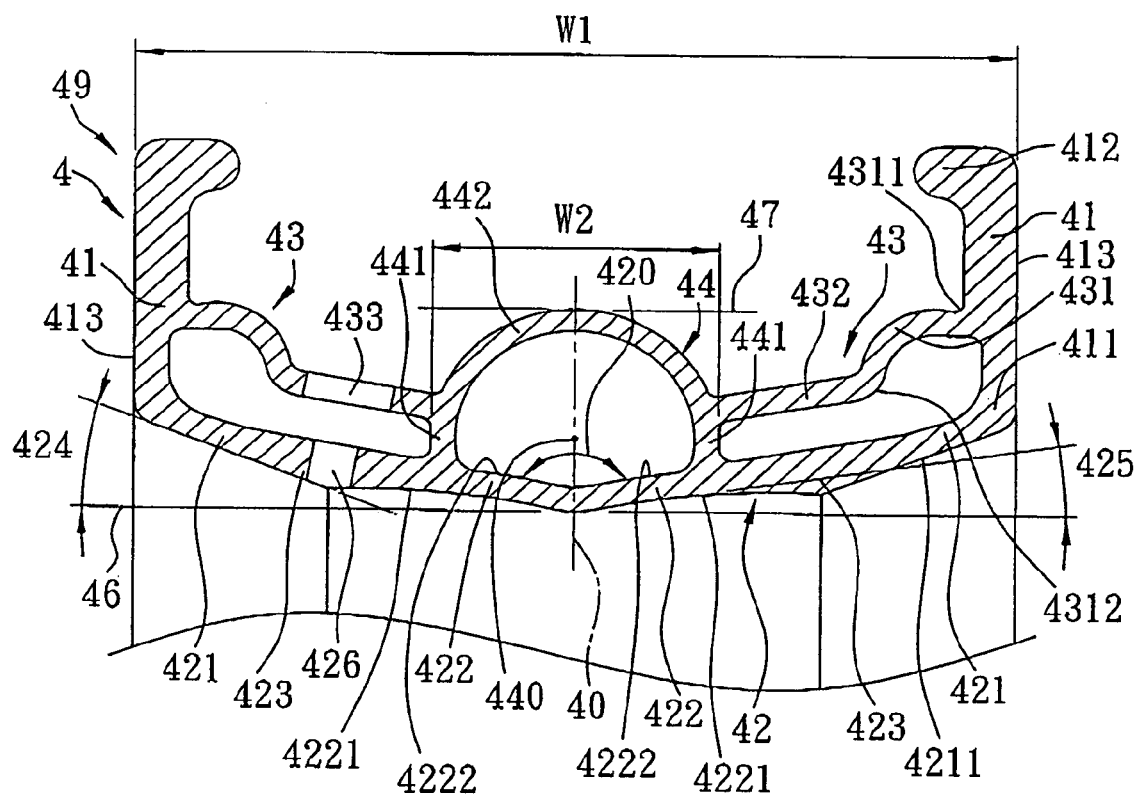
FIG. 3 is a fragmentary sectional view of a first preferred embodiment of a wheel rim according to the invention.
Figure 4:
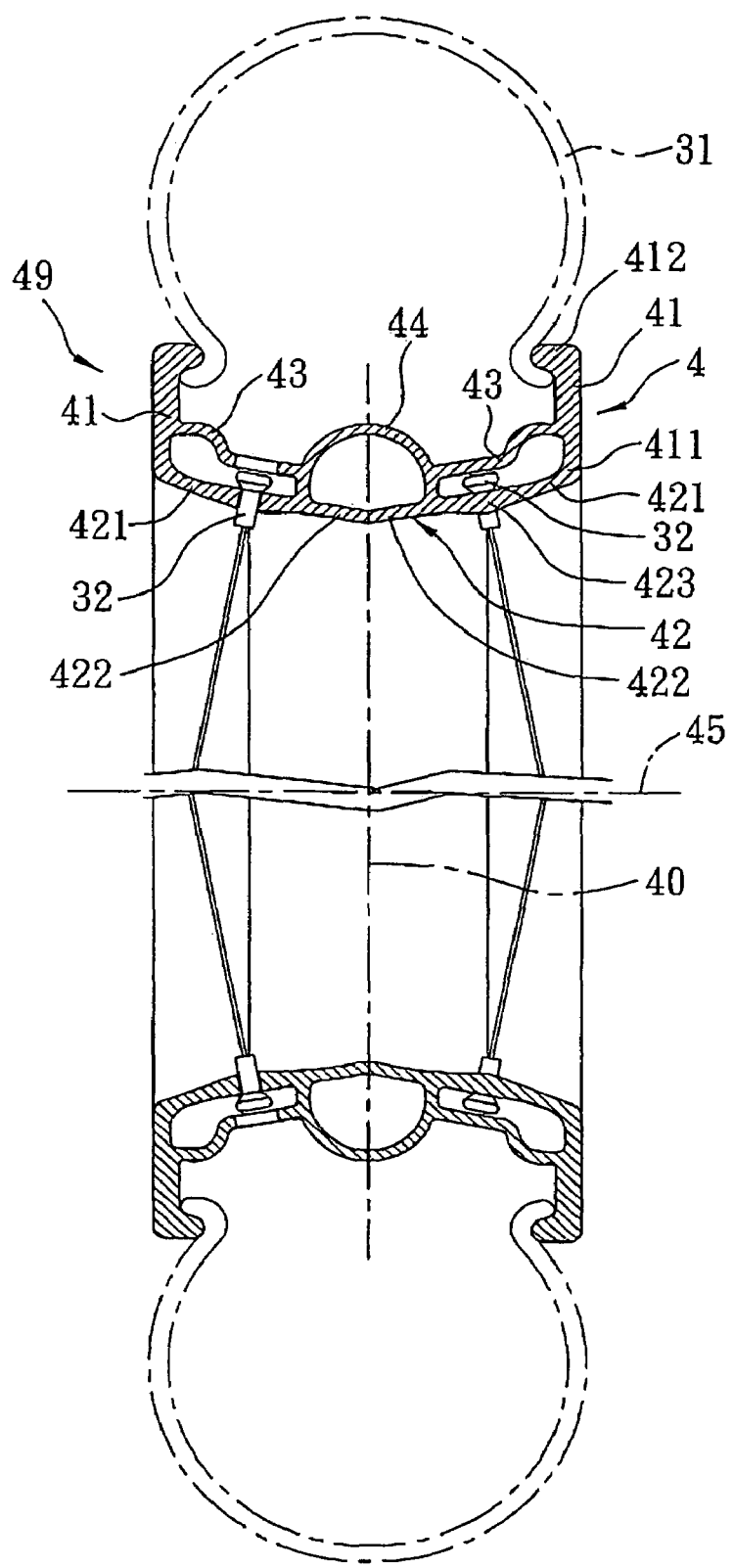
FIG. 4 is a fragmentary sectional view of the first preferred embodiment, illustrating a rim axis thereof.

As shown in FIGS. 3 and 4, the first preferred embodiment of a wheel rim 4 according to the present invention comprises an annular rim body 49 having a horizontally disposed rim axis 45 and an imaginary central plane 40 that is perpendicular to the rim axis 45. The rim body 49 includes a pair of annular side walls 41, an annular base wall 42, a pair of annular strengthening walls 43, and an annular reinforcing wall 44. The annular side walls 41 are disposed respectively on opposite sides of the imaginary central plane 40 and surround the rim axis 45. The annular base wall 42 interconnects the annular side walls 41. Each of the annular strengthening walls 43 extends from a respective one of the annular side walls 41 toward the imaginary central plane 40, and is disposed radially outward relative to the annular base wall 42. The annular reinforcing wall 44 interconnects the annular strengthening walls 43 and the annular base wall 42.

Each of the annular side walls 41 includes a radial outer edge 412 distal from the rim axis 45 and a radial inner edge 411 opposite to the radial outer edge 412. The annular base wall 42 interconnects the radial inner edges 411 of the annular side walls 41 and includes a pair of annular side segments 421, a pair of annular middle segments 422, and a pair of spoke fastening segments 423. Each of the annular side segments 421 of the annular base wall 42 extends from the radial inner edge 411 of a respective one of the annular side walls 41 toward the imaginary central plane 40. Each of the annular middle segments 422 of the annular base wall 42 extends from the imaginary central plane 40 toward a respective one of the annular side segments 421. Each of the spoke fastening segments 423 of the annular base wall 42 interconnects a respective one of the annular side segments 421 and a corresponding one of the annular middle segments 422. In this embodiment, each of the annular side segments 421 and the annular middle segments 422 has a thickness that is gradually increased in a direction toward the corresponding one of the spoke fastening segments 423. Preferably, the annular middle segments 422 intersect with the imaginary central plane 40 at an imaginary cylindrical plane 46 that surrounds and that is parallel to the rim axis 45. Each of the annular side segments 421 has a first radial inner side 4211 that confronts the rim axis 45 and that forms a first angle 424 with the imaginary cylindrical plane 46. Each of the annular middle segments 422 has a second radial inner side 4221 that confronts the rim axis 45 and that forms a second angle 425 with the imaginary cylindrical plane 46. The second angle 425 is smaller than the first angle 424. In this embodiment, each of the annular middle segments 422 further has a radial outer side 4222 opposite to the second radial inner side 4221, and the radial outer sides 4222 of the annular middle segments 422 form an angle 420 of less than 180 degrees therebetween. Each of the spoke fastening segments 423 is formed with a plurality of angularly spaced apart positioning holes 426.

Each of the annular strengthening walls 43 includes an arc portion 431 and a straight portion 432. The arc portion 431 has a first edge 4311 connected to the corresponding one of the annular side walls 41, and a second edge 4312 opposite to the first edge 4311. The straight portion 432 extends from the second edge 4312 of the arc portion 431 to connect to the annular reinforcing wall 44, and is formed with a plurality of through holes 433 that correspond in position to the positioning holes 426 in a corresponding one of the spoke fastening segments 423 of the annular base wall 42. Each of the through holes 433 is larger than each of the positioning holes 426. Each of a plurality of spoke fixing components 32 extends through a respective one of the through holes 433 and a corresponding one of the positioning holes 426.

In this embodiment, the annular reinforcing wall 44 is in a form of an arch that opens toward the rim axis 45, and has a radial cross-section relative to the rim axis 45 that is in a form of a segment of a circle, and that has a radius center 440 located on the imaginary central plane 40. The annular reinforcing wall 44 includes a pair of connecting segments 441, each of which interconnects the annular base wall 42 and a respective one of the annular strengthening walls 43, and a reinforcing protruding segment 442 that interconnects the connecting segments 441 and that protrudes radially and outwardly relative to the rim axis 45. Each of the annular side walls 41 has a radial outer surface 413, and a first width (W1) of the rim body 49 is defined as a distance between the radial outer surfaces 413 of the annular side walls 41 along the rim axis 45. Preferably, the annular reinforcing wall 44 has a second width (W2) that is measured along the rim axis 45 and that is one-third of the first width (W1) of the rim body 49. The annular reinforcing wall 44 intersects with the imaginary central plane 40 at an imaginary tangent plane 47 that surrounds and that is parallel to the rim axis 45. The distance between the imaginary tangent plane 47 and the imaginary cylindrical plane 46 is almost equal to that between the first edge 4311 of the arc portion 431 of a respective one of the annular strengthening walls 43 and the imaginary cylindrical plane 46.

Since each of the annular side segments 421 and the annular middle segments 422 has a thickness that is gradually increased in a direction toward the corresponding one of the spoke fastening segments 423, the annular base wall 42 has a greatest thickness at the spoke fastening segments 423, i.e., the annular base wall 42 has a relatively high strength at the spoke fastening segments 423. In addition, the annular reinforcing wall 44 is connected to the annular base wall 42 and the annular strengthening wall 43, and cooperates with the annular middle segments 422 of the annular base wall 42 to form a nearly circular structure, thereby effectively bearing and dispersing the stress forces applied to the wheel rim 4. Moreover, the second width (W2) of the annular reinforcing wall 44 is one-third of the first width (W1) of the rim body 49, and the annular reinforcing wall 44 is in a form of an arch that opens toward the rim axis 45, thereby making it harder for the wheel rim 4 to deform under the application of a lateral thrust force. Furthermore, while maintaining the same structure, i.e., under the same strength, the thicknesses of the annular base wall 42, the annular strengthening walls 43 and the annular reinforcing wall 44 can be reduced to result in a lighter weight for the rim body 49, which makes the wheel rim 4 more suitable for application to extreme sport vehicles.

Figure 5:
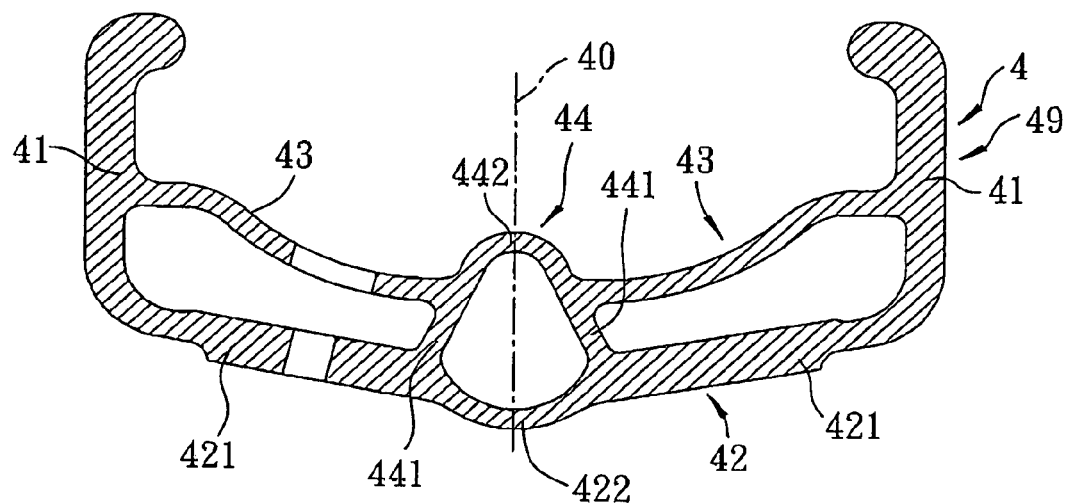
FIG. 5 is a fragmentary sectional view of a second preferred embodiment of a wheel rim according to the invention.

As shown in FIG. 5, the second preferred embodiment of the wheel rim 4 according to the present invention has a structure similar to that of the first embodiment. The main difference between this embodiment and the previous preferred embodiment resides in the configurations of the annular base wall 42 and the annular reinforcing wall 44 as outlined in the following. The annular base wall 42 includes a pair of annular side segments 421 and an annular middle segment 422. Each of the annular side segments 421 extends obliquely from a respective one of the annular side walls 41 toward the imaginary central plane 40. The annular middle segment 422 is disposed between the annular side segments 421, is in a form of an arch, and protrudes radially and inwardly relative to the annular side segments 421 toward the rim axis (not shown). The distance between the connecting segments 441 of the annular reinforcing wall 44 is gradually reduced in a radial outward direction away from the annular base wall 42. The second preferred embodiment has the same advantages as those of the first preferred embodiment.

Figure 6:
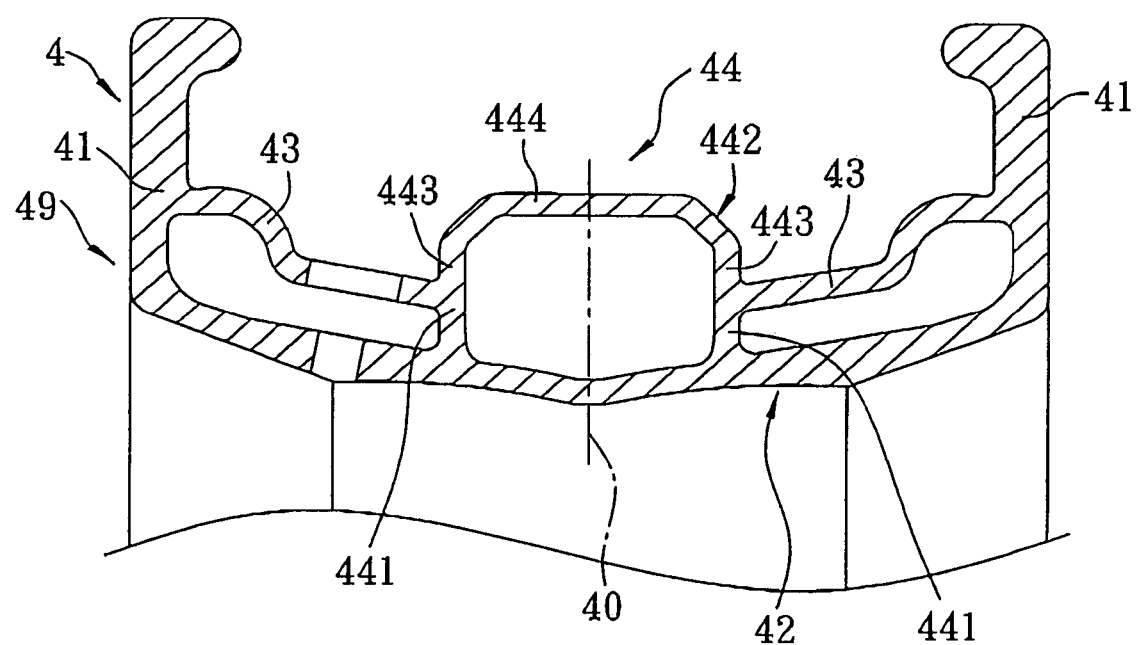
FIG. 6 is a fragmentary sectional view of a third preferred embodiment of a wheel rim according to the invention.

As shown in FIG. 6, the third preferred embodiment of the wheel rim 4 according to the present invention has a structure similar to that of the first embodiment. The main difference between this embodiment and the first preferred embodiment resides in the configuration of the annular reinforcing wall 44 as outlined in the following. The connecting segments 441 of the annular reinforcing wall 44 are disposed parallel to the imaginary central plane 40. The reinforcing protruding segment 442 of the annular reinforcing wall 44 includes a pair of radial extending portions 443 and an axial extending portion 444. Each of the radial extending portions 443 extends from a respective one of the connecting segments 441, and is disposed parallel to the imaginary central plane 40. The axial extending portion 444 interconnects the radial extending portions 443 and is perpendicular to the imaginary central plane 40. The third preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A wheel rim comprising an annular rim body having a horizontally disposed rim axis and an imaginary central plane that is perpendicular to the rim axis, said rim body including
   a pair of annular side walls disposed respectively on opposite sides of the imaginary central plane and surrounding the rim axis,
   an annular base wall interconnecting said annular side walls,
   a pair of annular strengthening walls, each of which extends from a respective one of said annular side walls toward the imaginary central plane and is disposed radially outward relative to said annular base wall, and
   an annular reinforcing wall including
      a pair of connecting segments, each of which interconnects said annular base wall and a respective one of said annular strengthening walls, and
      a reinforcing protruding segment that interconnects said connecting segments and that protrudes radially and outwardly relative to the rim axis.

2. The wheel rim as claimed in claim 1, wherein said annular reinforcing wall is in a form of an arch that opens toward the rim axis.

3. The wheel rim as claimed in claim 1, wherein said annular reinforcing wall has a radial cross-section relative to the rim axis that is in a form of a segment of a circle.

4. The wheel rim as claimed in claim 3, wherein the radial cross-section of said annular reinforcing wall has a radius center located on the imaginary central plane.

5. The wheel rim as claimed in claim 1, wherein:
   each of said annular side walls has a radial outer surface, a first width of said rim body being defined as a distance between said radial outer surfaces of said annular side walls along the rim axis; and
   said annular reinforcing wall has a second width that is measured along the rim axis and that is one-third of the first width of said rim body.

6. The wheel rim as claimed in claim 1, wherein said annular base wall includes
   a pair of annular side segments, each of which extends from a radial inner edge of a respective one of said annular side walls toward the imaginary central plane,
   a pair of annular middle segments, each of which extends from the imaginary central plane toward a respective one of said annular side segments, and
   a pair of spoke fastening segments, each of which interconnects a respective one of said annular side segments and a corresponding one of said annular middle segments;
   wherein said annular middle segments intersect with the imaginary central plane at an imaginary cylindrical plane that surrounds and that is parallel to the rim axis;
   wherein each of said annular side segments has a first radial inner side that confronts the rim axis and that forms a first angle with the imaginary cylindrical plane; and
   wherein each of said annular middle segments has a second radial inner side that confronts the rim axis and that forms a second angle with the imaginary cylindrical plane, the second angle being smaller than the first angle.

7. The wheel rim as claimed in claim 6, wherein each of said spoke fastening segments is formed with a plurality of positioning holes, and each of said annular strengthening walls is formed with a plurality of through holes that correspond in position to said positioning holes.

8. The wheel rim as claimed in claim 6, wherein each of said annular middle segments further has a radial outer side opposite to said second radial inner side, said radial outer sides of said annular middle segments forming an angle of less than 180 degrees therebetween.

9. The wheel rim as claimed in claim 1, wherein said annular base wall includes
   a pair of annular side segments, each of which extends from a radial inner edge of a respective one of said annular side walls toward the imaginary central plane,
   a pair of annular middle segments, each of which extends from the imaginary central plane toward a respective one of said annular side segments, and
   a pair of spoke fastening segments, each of which interconnects a respective one of said annular side segments and a corresponding one of said annular middle segments;
   wherein each of said annular side segments and said annular middle segments has a thickness that is gradually increased in a direction toward the corresponding one of said spoke fastening segments.

10. The wheel rim as claimed in claim 9, wherein each of said spoke fastening segments is formed with a plurality of positioning holes, and each of said annular strengthening walls is formed with a plurality of through holes that correspond in position to said positioning holes.

11. The wheel rim as claimed in claim 1, wherein a distance between said connecting segments of said annular reinforcing wall is gradually reduced in a radial outward direction away from said annular base wall.

12. The wheel rim as claimed in claim 11, wherein said annular base wall includes
   a pair of annular side segments, each of which extends obliquely from a respective one of said annular side walls toward the imaginary central plane, and
   an annular middle segment which is disposed between said annular side segments, which is in a form of an arch, and which protrudes radially and inwardly relative to said annular side segments toward the rim axis.

13. The wheel rim as claimed in claim 1, wherein:
   said connecting segments of said annular reinforcing wall are disposed parallel to the imaginary central plane; and
   said reinforcing protruding segment of said annular reinforcing wall includes
      a pair of radial extending portions, each of which extends from a respective one of said connecting segments, and is disposed parallel to the imaginary central plane, and
      an axial extending portion that interconnects said radial extending portions and that is perpendicular to the imaginary central plane.

14. The wheel rim as claimed in claim 1, wherein said annular base wall includes
   a pair of annular side segments, each of which extends from a radial inner edge of a respective one of said annular side walls toward the imaginary central plane,
   a pair of annular middle segments, each of which extends from the imaginary central plane toward a respective one of said annular side segments, and
   a pair of spoke fastening segments, each of which interconnects a respective one of said annular side segments and a corresponding one of said annular middle segments, and is formed with a plurality of positioning holes disposed between the respective one of said annular side walls and a respective one of said connecting segments of said annular reinforcing wall.

* * * * *